(Model.)

F. T. PINTER.
PLOW.

No. 244,295. Patented July 12, 1881.

Witnesses.
Wm. W. Mortimer
A. C. Kiskadden

Inventor.
F. T. Pinter,
per
F. A. Lehmann,
Atty.

UNITED STATES PATENT OFFICE.

FRANCIS T. PINTER, OF SCHULENBURG, TEXAS.

PLOW.

SPECIFICATION forming part of Letters Patent No. 244,295, dated July 12, 1881.

Application filed May 4, 1881. (Model.)

To all whom it may concern:

Be it known that I, FRANCIS T. PINTER, of Schulenburg, in the county of Fayette and State of Texas, have invented certain new and useful Improvements in Plows; and I do hereby declare the following to be a full, clear, and exact description of the invention, such as will enable others skilled in the art to which it pertains to make and use it, reference being had to the accompanying drawings, which form part of this specification.

My invention relates to an improvement in plows; and it consists in combining with the plow a furrow-cutter for the purpose of cutting or dividing the furrow-slice and pulverizing it to a greater or less extent, like a harrow, substantially as described.

The object of my invention is to provide a plow with handles which can be adjusted so as to suit different-sized men, and a device by means of which the furrow-slice can be more or less subdivided as the plow is drawn along.

Figure 1:
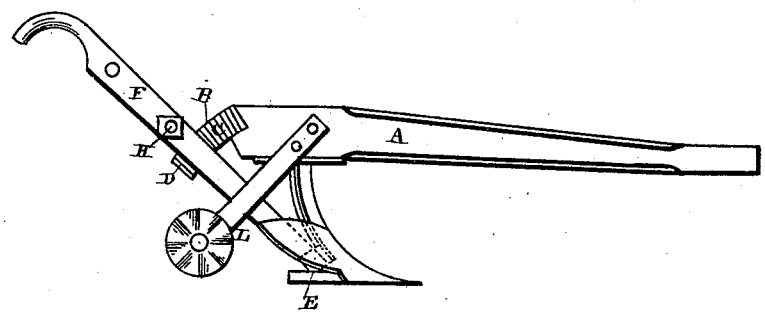
Figure 3:
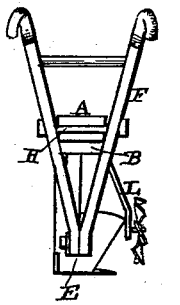
Figure 2:
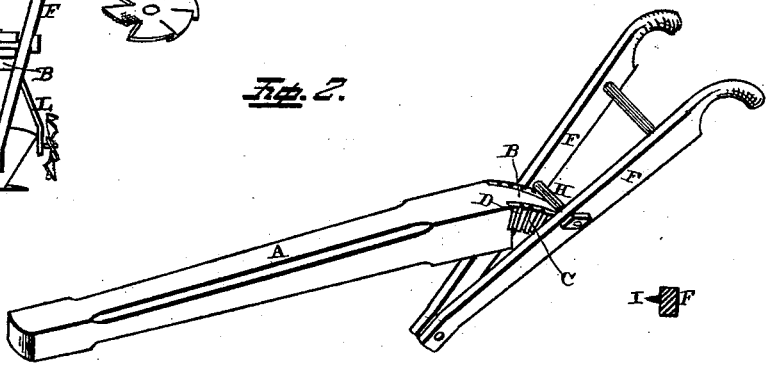

Figure 1 is a side elevation of my invention complete. Fig. 2 is a perspective of the beams and the handles attached. Fig. 3 is a rear view, showing also the pulverizing-disk detached.

A represents the beam, which may be of any suitable shape, size, or construction, and which has the extension B formed upon its rear end. When the beam is made of wood this extension will be covered by a casing, C, of iron, and which casing has a series of corrugations, D, made in its sides, as shown in Fig. 2.

Upon the rear side of the standard, or any other suitable part of the plow, is made a projection or extension, E, upon which the lower ends of the handles F are bolted or pivoted in any suitable manner. These two handles extend up above the rear end of the beam, so that the projection B passes between them, and these two handles are clamped rigidly against the sides of this extension by means of a clamping bolt or bolts, H. On the inner side of one or both of these handles is formed a suitable sharp projection, I, which catches in the notches, so that when the handles have been adjusted into any one position it will be securely held. These handles are thus made adjustable back and forth upon this rear end of the beam, for the purpose of raising or lowering the handle to suit persons of different heights.

Secured to the side of the beam, at a point slightly behind where the standard is secured to the under side of the beam, is a furrow-cutter, L. This cutter consists of a curved or bent shank which can be adjusted up and down upon the side of the beam, and a cutting-wheel which has its edge cut and bent in the manner shown. The object of this furrow-cutter is to run along upon the top of the furrow-slice, and not only cut and divide it, but to scatter the earth, and thus act to a certain extent like a harrow.

Having thus described my invention, I claim—

The combination of a plow with a furrow-cutter consisting of a shank which is secured to the side of the beam, and the cutting-wheel having its edge bent as shown, substantially as specified.

In testimony whereof I affix my signature in presence of two witnesses.

FRANCIS T. PINTER.

Witnesses:
JOHN McNELLY,
G. M. JOHNSON.